United States Patent
Zhao et al.

(10) Patent No.: US 9,913,110 B2
(45) Date of Patent: Mar. 6, 2018

(54) METHODS AND SYSTEMS FOR IMPLEMENTING A SELF-MANAGED CONTROL CHANNEL

(71) Applicant: MOTOROLA SOLUTIONS, INC, Chicago, IL (US)

(72) Inventors: Kang-Kai Zhao, Chengdu (CN); Hong-Xia Wang, Chengdu (CN); Li Wang, Chengdu (CN); Yu Zhou, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/507,257

(22) PCT Filed: Oct. 8, 2014

(86) PCT No.: PCT/CN2014/088155
§ 371 (c)(1),
(2) Date: Feb. 28, 2017

(87) PCT Pub. No.: WO2016/054776
PCT Pub. Date: Apr. 14, 2016

(65) Prior Publication Data
US 2017/0289777 A1  Oct. 5, 2017

(51) Int. Cl.
*H04B 7/00*     (2006.01)
*H04W 4/10*    (2009.01)
*H04W 68/00*   (2009.01)

(52) U.S. Cl.
CPC .......... *H04W 4/10* (2013.01); *H04W 68/005* (2013.01)

(58) Field of Classification Search
CPC ....... H04W 68/005; H04W 4/10; H04W 4/22; H04W 64/00; H04W 76/007
(Continued)

(56) References Cited

U.S. PATENT DOCUMENTS

| | | |
|---|---|---|
| 5,231,699 A | 7/1993 | Tendler |
| 6,026,300 A | 2/2000 | Hicks |

(Continued)

FOREIGN PATENT DOCUMENTS

| | | |
|---|---|---|
| CN | 1774115 A | 5/2006 |
| CN | 101026818 A | 8/2007 |

(Continued)

OTHER PUBLICATIONS

The International Search Report and The Written Opinion, corresponding patent application No. PCT/CN2014/088155, filed: Oct. 8, 2014, all pages.

*Primary Examiner* — Shaima Q Aminzay (57) ABSTRACT

Disclosed herein are methods and systems for implementing a self-managed control channel. A mobile radio is a member of a talkgroup. The mobile radio has first and second receivers, and a preconfigured channel list that includes a control channel and multiple voice channels. The mobile radio monitors which voice channels are busy, and monitors the control channel using the first receiver. The mobile radio detects a session-start event. If that event is a session-start command, the mobile radio selects an idle voice channel and transmits, via the control channel, a session-start notification identifying the talkgroup and specifying the selected voice channel. If that event is receipt, via the control channel, of a session-start notification identifying the talkgroup and specifying a voice channel, the mobile radio determines whether the second receiver is tuned to that voice channel and, if not, tunes the second receiver to that voice channel.

20 Claims, 7 Drawing Sheets

(58) Field of Classification Search
USPC ..... 455/518, 519, 514, 3.05, 90.2, 415, 416; 370/260
See application file for complete search history.

(56) References Cited

U.S. PATENT DOCUMENTS

| | | |
|---|---|---|
| 6,459,690 B1 | 10/2002 | Le Strat et al. |
| 6,519,472 B1 | 2/2003 | Brennan et al. |
| 8,427,996 B2 | 4/2013 | Woodward et al. |
| 2010/0087199 A1* | 4/2010 | Chowdhary ........ H04W 72/005 455/450 |
| 2013/0156134 A1 | 6/2013 | Galan et al. |

FOREIGN PATENT DOCUMENTS

| | | |
|---|---|---|
| GB | 2377854 A | 1/2003 |
| WO | 2010039632 A2 | 4/2010 |

* cited by examiner

FIG. 7

METHODS AND SYSTEMS FOR IMPLEMENTING A SELF-MANAGED CONTROL CHANNEL

BACKGROUND OF THE INVENTION

It is important for public-safety responders to be able to communicate with each other on a regular basis. As a result, one of the most commonly used tools in the public-safety context is a mobile radio. Some mobile radios communicate via cellular radio networks, some communicate via ad-hoc device-to-device connections (as part of, e.g., an ad-hoc network of such connections); such communication is referred to interchangeably in this disclosure at various times using adjectives such as direct, direct-mode, localized, point-to-point, peer-to-peer, and the like. Some mobile radios are equipped, programmed, and configured to be able to communicate via both cellular networks and ad-hoc arrangements, perhaps in addition to being able to communicate according to one or more other configurations. Mobile radios may be incorporated into or with one or more other devices such as cell phones, smartphones, tablets, notebook computers, laptop computers, and the like. Moreover, some mobile radios are referred to at times using terms such as handheld, handheld transceiver, walkie-talkie, two-way radio, and the like. As one example, some devices include the functionality of both a smartphone and a mobile radio. And certainly many other examples could be listed, as known to those having skill in the relevant art.

Public-safety personnel utilize mobile radios in talkgroups so that multiple responders can simultaneously hear what one person is saying, and so that talkgroup members can respond in an easy and effective fashion. This is far more efficient than a responder serially sending out the same message to a plurality of allies. It is desirable for a public-safety responder to be able to communicate with as many allies as possible as efficiently as possible for at least the reason that the immediacy and efficacy with which public-safety responders can communicate with one another are quite often determinative with respect to how positive the ultimate outcome of a given incident can be. Accordingly, there is a need for methods and systems for implementing a self-managed control channel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for implementing a self-managed control channel. One embodiment takes the form of a process that is carried out by a mobile radio that is a member of a talkgroup, the mobile radio having first and second receivers and a preconfigured channel list that includes a control channel and multiple voice channels. The process includes maintaining voice-channel-status data reflecting which of the voice channels in the preconfigured channel list are currently busy or idle, monitoring the control channel at least in part by residing the first receiver on the control channel, and detecting a session-start event. If the session-start event includes receipt, via a user interface, of a session-start command, the mobile radio carries out a set of one or more session-initiation functions, including selecting an idle one of the voice channels, and transmitting, via the control channel, a session-start notification that identifies the talkgroup and specifies the selected voice channel. If the session-start event includes receipt, via the control channel, of a session-start notification that identifies the talkgroup and specifies one of the voice channels in the preconfigured channel list, the mobile radio carries out a set of one or more session-joining functions, including determining whether the second receiver is currently tuned to the specified voice channel and, if not, then responsively tuning the second receiver to the specified voice channel.

Another embodiment takes the form of a mobile radio that is a member of a talkgroup. The mobile radio includes first and second receivers, a preconfigured channel list that includes a control channel and multiple voice channels, a processor, and data storage containing instructions executable by the processor for causing the mobile radio to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the second receiver resides on an idle one of the voice channels when not participating in a talkgroup session.

In at least one embodiment, the second receiver is powered down when not participating in a talkgroup session.

In at least one embodiment, the set of session-initiation functions further includes updating the voice-channel-status data to indicate that the specified voice channel is busy.

In at least one embodiment, the set of session-joining functions further includes updating the voice-channel-status data to indicate that the specified voice channel is busy.

In at least one embodiment, if the session-start event includes receipt, via the control channel, of a session-start notification that identifies a different talkgroup and specifies one of the voice channels in the preconfigured channel list, the mobile radio carries out a set of one or more session-avoiding functions, including updating the voice-channel-stats data to indicate that the specified voice channel is busy, and determining whether the second receiver is currently tuned to the specified voice channel and, if so, then responsively configuring the second receiver to not be tuned to the specified voice channel. In at least one such embodiment, configuring the second receiver to not be tuned to the specified voice channel includes tuning the second receiver to an idle one of the voice channels. In at least one other such embodiment, configuring the second receiver to not be tuned to the specified voice channel comprises powering down the second receiver.

In at least one embodiment, the mobile radio detects, via the second receiver, that a voice channel to which the second receiver is currently tuned is in use by a different talkgroup and responsively mutes that voice channel and updates the voice-channel-status data to indicate that the voice channel is busy.

In at least one embodiment, the mobile radio selects an idle one of the voice channels and carries out a channel-testing process. The channel-testing process includes preselecting an idle one of the voice channels, transmitting on the preselected voice channel for a randomly selected amount of time, and thereafter checking the preselected voice channel for transmissions from another mobile radio. If no other such transmissions are detected on the preselected voice channel, the mobile radio designates the preselected voice channel as being the selected voice channel. If such transmissions are detected on the preselected voice channel, the mobile radio updates the voice-channel-status data to indicate that the preselected voice channel is busy, and repeats the channel-testing process.

In at least one embodiment, the mobile radio periodically conveys the voice-channel-status data via the control channel.

In at least one embodiment maintaining the voice-channel-status data includes receiving broadcast voice-channel-status data and responsively accordingly updating the maintained voice-channel-status data.

In at least one embodiment, the mobile radio scans one or more of the voice channels, and if the mobile radio detects a session-start event for an ongoing session for the talkgroup on a particular one of the voice channels, then the mobile radio plays out audio received on the particular voice channel and updates the voice-channel-status data to indicate that the particular voice channel is busy. In at least one such embodiment, detecting an ongoing session for the talkgroup includes detecting an identifier of the talkgroup. In at least one other such embodiment, detecting an ongoing session for the talkgroup includes detecting an identifier of another mobile radio that is also a member of the talkgroup. In at least one other such embodiment, updating the voice-channel-status data is based at least in part on the scanning of one or more of the voice channels.

In at least one embodiment, the mobile radio maintains a hang timer with respect to talkgroup transmissions on the specified voice channel, and upon detecting an expiration of the hang timer, responsively carries out a set of session-termination functions, including updating the voice-channel-status data to indicate that the specified voice channel is idle. In at least one such embodiment, the set of session-termination functions further includes transmitting a session-termination message via the control channel.

In at least one embodiment, the mobile radio receives a session-termination message via the control channel, and responsively updates the voice-channel-status data to indicate that the specified voice channel is idle.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

Figure 1:
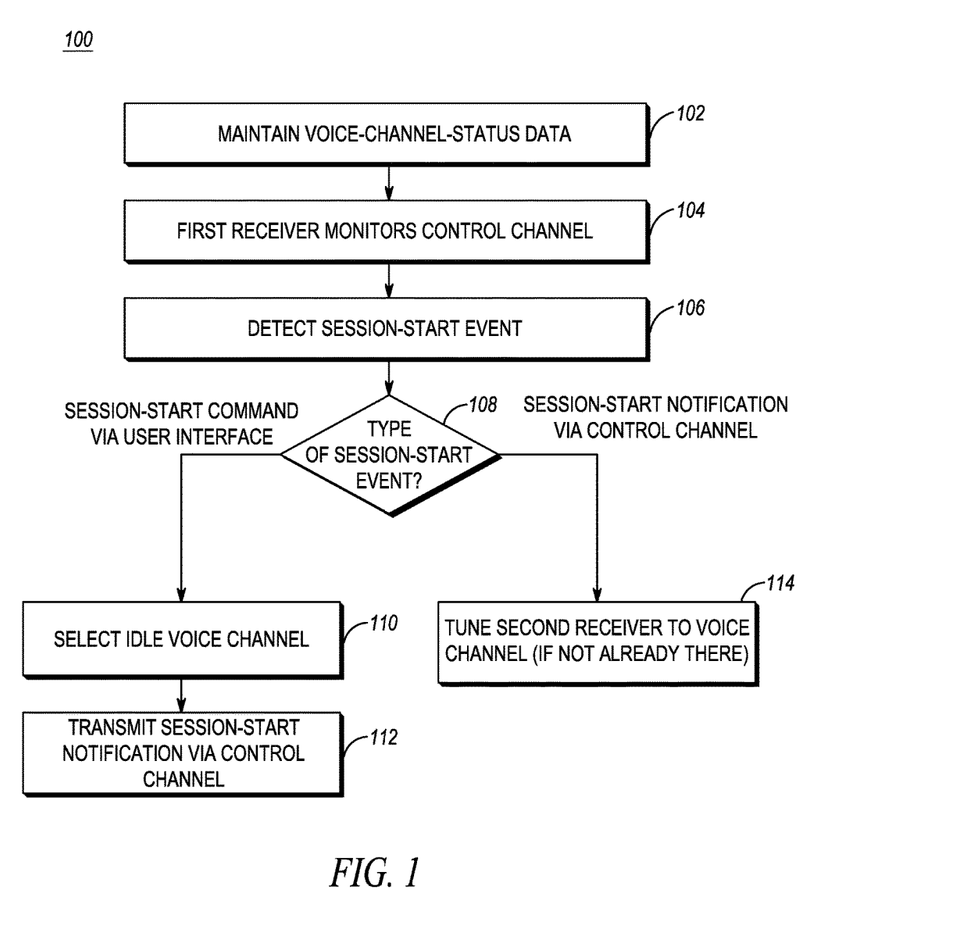
FIG. 1 depicts an example process, in accordance with an embodiment.

FIG. 1 depicts an example process, in accordance with an embodiment. In particular, FIG. 1 depicts a process 100 that in at least one embodiment is carried out by a mobile radio that is a member of a talkgroup that is referred to in this example description as the particular talkgroup. The description of the process 100 as being carried out by a mobile radio is provided by way of example, as other suitably equipped and programmed devices could carry out the process 100.

At step 102, a mobile radio maintains voice-channel-status data. The mobile radio is equipped with a preconfigured channel list that includes a control channel and multiple voice channels. The voice-channel-status data includes information on whether each respective voice channel is either busy or idle. This voice-channel-status data could be stored in a variety of different ways. In an embodiment, the voice-channel-status data is stored in association with the stored channel list, such that each data record for each respective voice channel has a field that reflects whether that voice channel is currently busy or idle. In an embodiment, the voice-channel-status data is maintained entirely separately from the preconfigured channel list. In embodiments where a separate indicator is maintained for each voice channel (whether stored in association with the preconfigured channel list or not), those indicators could take the form of flags, Boolean values, and/or any other suitable indicator of busy or idle. In some embodiments, the voice-channel-status data takes the form of an idle-channel list: if a voice channel is on the idle-channel list, it's idle, otherwise it's busy. In other embodiments, the voice-channel-status data takes the form of a busy-channel list: if a voice channel is on the busy-channel list, it's busy, otherwise it's idle. And certainly numerous other example implementations could be listed here.

At step 104, the mobile radio monitors the control channel at least in part by residing its first receiver on the control channel, which is one of the channels that is included in the mobile radio's preconfigured channel list.

At step 106, the mobile radio detects a session-start event. As shown at decision box 108, if the detected session-start event is receipt via a user interface of a session-start command, then the mobile radio carries out a set of one or more session-initiation functions; two such functions are depicted in FIG. 1 at session-initiation steps 110 and 112. If, however, the detected session-start event is receipt, via the control channel (that is being monitored with the first receiver), of a session-start notification that identifies the particular talkgroup (i.e., the mobile radio's talkgroup) and specifies one of the voice channels, then the mobile radio carries out a set of one or more session-joining functions; one such function is depicted in FIG. 1 at session-joining step 114.

At session-initiation step 110, the mobile radio refers to its stored voice-channel-status data and selects a voice channel from the preconfigured channel list that is indicated by the voice-channel-status data as being idle. At session-initiation step 112, the mobile radio transmits a session-start notification via the control channel. The session-start notification contains data identifying the particular talkgroup (i.e., the mobile radio's talkgroup) and specifying the idle voice channel that the mobile radio selected at step 110.

At session-joining step 114, the mobile radio checks whether its second receiver is currently tuned to the voice channel that was specified in the received session-start notification. If its second receiver is not already tuned to that specified voice channel, then the mobile radio responsively tunes its second receiver to that specified voice channel.

Moreover, it is noted that the various steps 102-114 that are depicted in FIG. 1 are also further described below in connection with FIGS. 3-5, which depict various scenarios in which multiple different mobile radios are each independently embodying the present methods and systems, collectively achieving a self-managed control channel for the respective talkgroup to which they belong.

Figure 2:
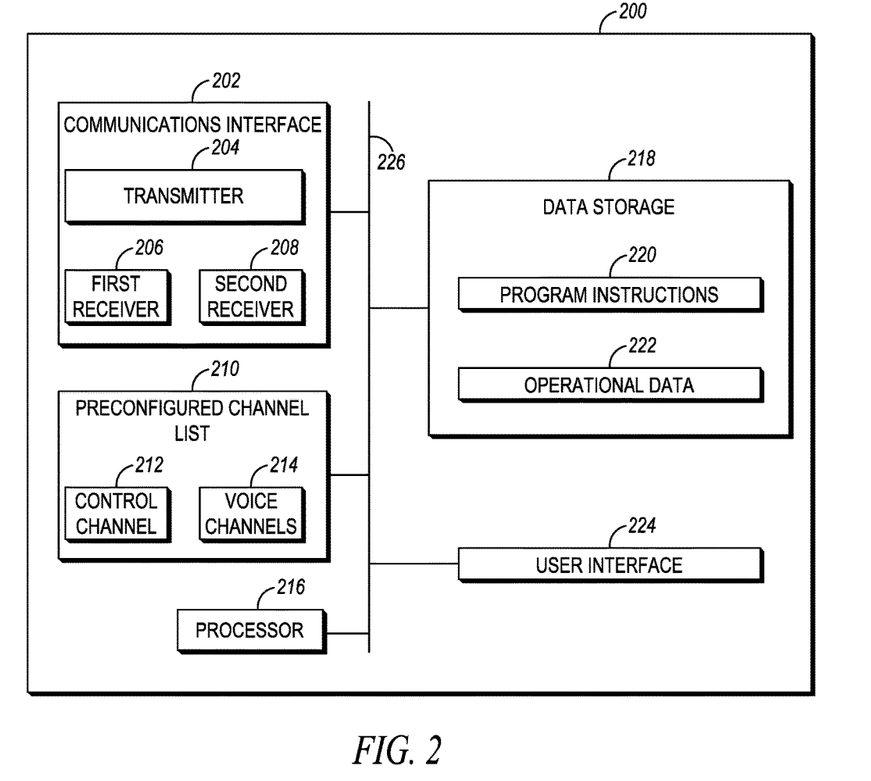
FIG. 2 depicts an example mobile radio, in accordance with an embodiment.

FIG. 2 depicts an example mobile radio, in accordance with an embodiment. In particular, FIG. 2 depicts an example mobile radio 200 as including a communication interface 202, a preconfigured channel list 210, a processor 216, a data storage 218, and a user interface 224, all of which are communicatively coupled with one another via a system bus 226 (or other suitable communication connection, network, or the like).

In the depicted example, the communication interface 202 includes a transmitter 204, a first receiver 206, and a second receiver 208. The transmitter 204 can be configured to transmit on one of a set of channels. Each of the first receiver 206 and the second receiver 208 can be configured (e.g., tuned) to receive on one of a set of channels. The communication interface 202 may be configured to be operable for communicating according to one or more wireless-communication protocols, some examples of which include RF, LTE, APCO P25, ETSI DMR, TETRA, WiFi, Bluetooth, and the like. The communication interface 202 may also include one or more wired-communication interfaces (for communicating according to, e.g., Ethernet, USB, and/or one or more other protocols). As such, the communication interface 202 may include any necessary hardware (e.g., chipsets, antennas, Ethernet cards, etc.), any necessary firmware, and any necessary software for conducting one or more forms of communication with one or more other entities as described herein.

In the depicted example, the preconfigured channel list 210 contains a control channel 212 and multiple voice channels 214. Each mobile radio 200 contains a preconfigured channel list 210 of available channels. One of the channels of the preconfigured channel list 210 is configured as the control channel 212. The remainder of the channels of the preconfigured channel list 210 are configured as the voice channels 214. While this embodiment describes the channels as multiple voice channels 214, this is by way of example and not limitation, as one with skill in the relevant art could use these channels to transmit other information including but not limited to audio, video, data, and the like. The preconfigured channel list 210 may be stored in a data storage, such as data storage 218, or a separate computer readable memory, such as a flash memory, read-only memory, or code-plug.

The processor 216 may include one or more processors of any type deemed suitable by those of skill in the relevant art, some examples including a general-purpose microprocessor and a dedicated digital signal processor (DSP).

The data storage 218 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 218 contains program instructions 220 executable by the processor 216 for carrying out various functions described herein, and further is depicted as containing operational data 222, which may include any one or more data values stored by and/or accessed by the example mobile radio 200 in carrying out one or more of the functions described herein.

The user interface 224 may include one or more input devices (a.k.a. components and the like) and/or one or more output devices (a.k.a. components and the like). With respect to input devices, the user interface 224 may include one or more touchscreens, buttons, switches, microphones, and the like. With respect to output devices, the user interface 224 may include one or more displays, speakers, light emitting diodes (LEDs), and the like. Moreover, one or more components (e.g., an interactive touchscreen and display) of the user interface 224 could provide both user-input and user-output functionality. And other user-interface components (e.g., a PTT button) could be present, as known to those of skill in the art.

Figure 3:
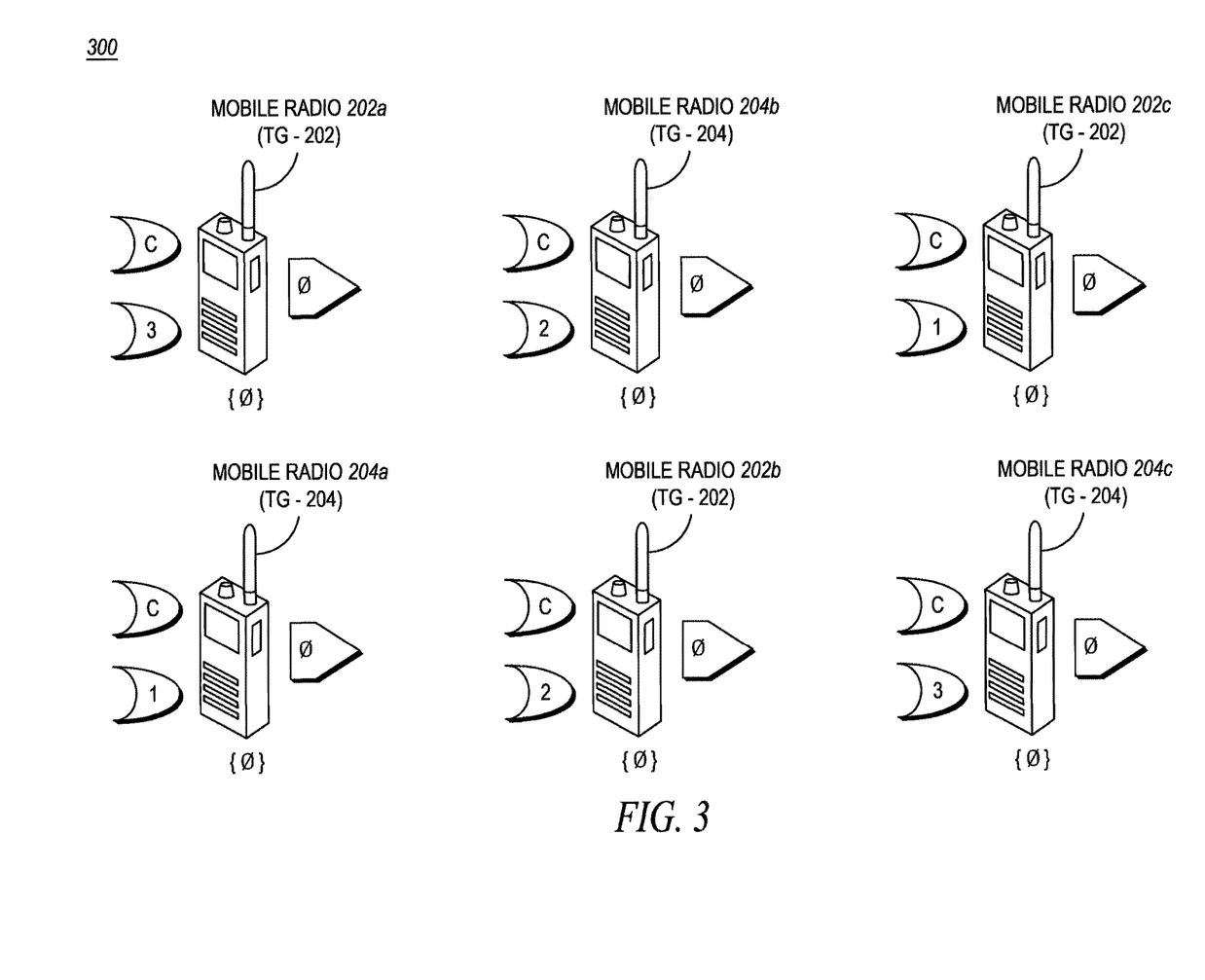
FIG. 3 depicts a first example scenario involving a plurality of mobile radios, in accordance with an embodiment.

FIG. 3 depicts a first example scenario involving a plurality of mobile radios, in accordance with an embodiment. In particular, FIG. 3 depicts an example scenario 300 that includes six mobile radios 202a-c and 204a-c. In the depicted example, the mobile radios 202a-c are part of a first talkgroup that is referred to in this disclosure as talkgroup 202, while the mobile radios 204a-c are part of a second, different, talkgroup that is referred to in this disclosure as talkgroup 204.

Each of the mobile radios 202a-c and 204a-c may have a structure similar to that described in connection with the example mobile radio 200 of FIG. 2, and each may be configured (e.g., equipped and programmed) to independently carry out processes such as the example process 100 that is described in connection with FIG. 1. It is not necessary, however, that all six of the mobile radios be identically programmed. For example, one or more of the mobile radios 202a-c and 204a-c may be programmed to reside their respective second receiver on an idle voice channel when not participating in a talkgroup session, while one or more others of the mobile radios 202a-c and 204a-c may be programmed to power down their respective second receiver when not participating in a talkgroup session. And numerous other similar examples that mix and match the various alternatives disclosed herein could be listed here as well, as will be appreciated by those having skill in the relevant art. It is noted, however, that in the examples that are depicted in FIGS. 3-5, each of the mobile radios 202a-c and 204a-c are programmed to reside their respective second receiver on an idle one of the voice channels when not participating in a talkgroup session. Again, this is by way of example and not limitation.

In the examples that are depicted in and described in connection with FIGS. 3-5, all six of the mobile radios 202a-c and 204a-c are configured with the same preconfigured channel lists; i.e., all six of those mobile radios consider the same particular channel to be the control channel, and all six of those mobile radios operate according to the same list of multiple voice channels. This is for simplicity of explanation and not by way of limitation, as in other embodiments various mobile radios are configured with preconfigured channel lists that vary amongst one another. Moreover, in at least one embodiment, the first and second talkgroups 202 and 204 are PTT talkgroups, though certainly the talkgroups could be of other varieties.

Figure 4:
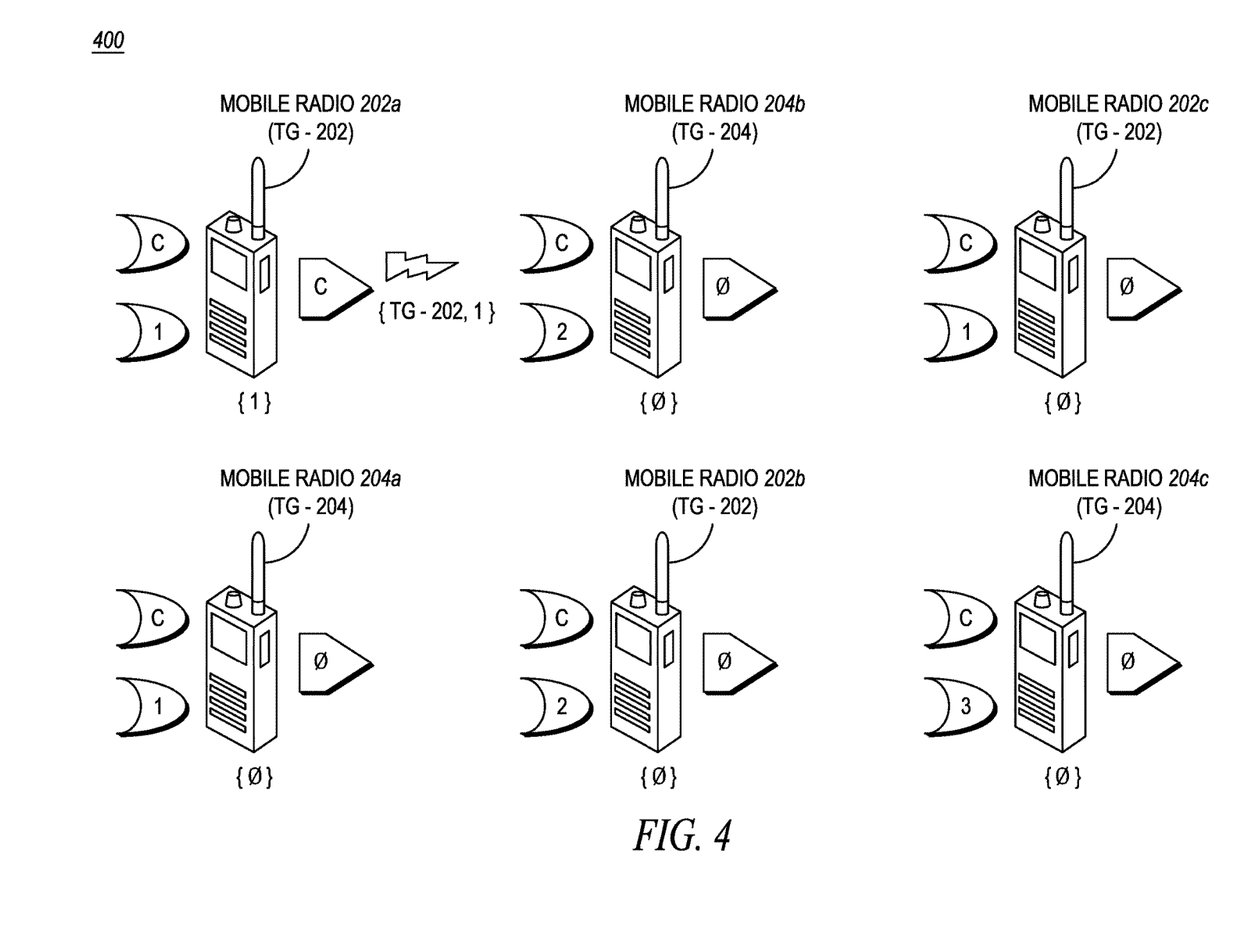
FIG. 4 depicts a second example scenario involving the mobile radios of FIG. 3, in accordance with an embodiment.
Figure 5:
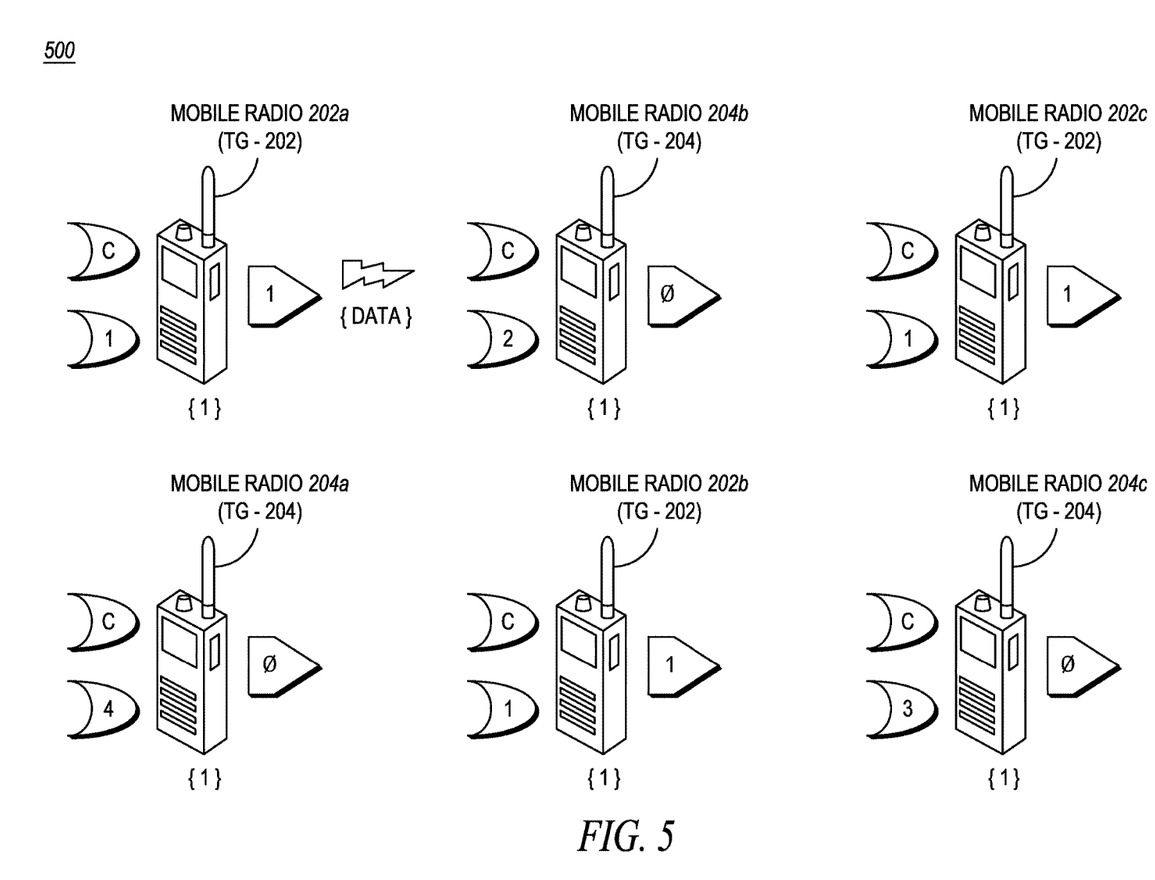
FIG. 5 depicts a third example scenario involving the mobile radios of FIG. 3, in accordance with an embodiment.

In FIGS. 3-5, each mobile radio 202a-c and 204a-c is depicted along with a transmit-channel indicator on its respective right side, two receive-channel indicators on its respective left side, a voice-channel-status indicator below, and a talkgroup label above. By way of convention, the first receiver 206 and the second receiver 208, as described in the mobile radio 200 of FIG. 2 are depicted on the top left and the bottom left, respectively, of each mobile radio 202a-c and 204a-c. Moreover, in FIGS. 3-5, the voice-channel-status indicators (i.e., the voice-channel-status data) take the form of a busy-channel list. As such, a given mobile radio denotes a given voice channel as being busy by placing that given voice channel in its respective busy list; the given mobile radio impliedly denotes voice channels that are not in its respective busy list as being currently idle. This is by way of example and not limitation.

In connection with each respective mobile radio 202a-c and 204a-c that is depicted in the example scenarios 300, 400, and 500 of FIGS. 3-5, various characters are used to depict each mobile radio's current transmit channel (i.e., the channel to which their respective transmitter 204 is currently tuned), current first-receiver channel (i.e., the channel to which the respective mobile radio's first receiver 206 is currently tuned), current second-receiver channel (i.e., the channel to which the respective mobile radio's second receiver 208 is currently tuned), and the one or more channels (if any) in the respective mobile radio's busy-channel list. In particular, the capital letter "C" represents the control channel, a one-digit number represents a voice channel (e.g., "2" represents a voice channel 2), and the "Ø" symbol represents that a given mobile radio in a given scenario does not have a current selection for that particular channel. Similarly, the "Ø" symbol represents empty busy-channel lists. Moreover, it is noted that, in certain embodiments and in certain instances, all of the channels that are designated in the preconfigured channel list as being voice channels could be occupied with talkgroup sessions; in some such instances, the control channel could be used as a voice channel. As such, though such a scenario is not depicted in FIGS. 3-5, a mobile radio could have a "C" in its busy-channel list.

Thus, it can be seen that the example scenario 300 of FIG. 3 could correspond with an initial condition, i.e. a time at which none of the mobile radios 202a-c and 204a-c are engaged in a talkgroup session. As such, and in the depicted example embodiment, all six mobile radios 202a-c and 204a-c have no currently selected transmit channel, have their first-receiver channel set to the control channel, and have their second-receiver channel set to an idle voice channel. It is noted that all voice channels are idle in the example scenario 300 that is depicted in FIG. 3. Moreover, in various embodiments, a mobile radio may use any ordered, random, or pseudorandom function for selecting an idle voice channel on which to reside its respective second receiver. In the example scenario 300, the mobile radios 202a and 204c have selected channel "3" as their respective second-receiver channels; the mobile radios 202b and 204b have selected channel "2"; and the mobile radios 202c and 204a have selected channel "1". Again, this is purely by way of example.

Moreover, in connection with FIGS. 4 and 5, various mobile radios 202a-c and 204a-c are described at various different times as carrying out functions that correspond with one or more of the steps 102-114 of the example process 100 that is described above in connection with FIG. 1. Such correspondence is indicated in the ensuing descriptions of FIGS. 4 and 5 using parentheticals. It is explicitly noted that such correspondences are meant to broadly indicate that the respective associated mobile radio has carried out and/or is carrying out the indicated one or more steps. It is also noted that the maintaining of the respective busy-channel lists and the residing of the respective first receivers on the control channel correspond to each respective mobile radio 202a-c and 204a-c carrying out steps 102 and 104, respectively.

FIG. 4 depicts a second example scenario involving the mobile radios of FIG. 3, in accordance with an embodiment. In particular, FIG. 4 depicts an example scenario 400 that is an iteration from the example scenario 300 that is described above in connection with FIG. 3. In the example scenario 400, the mobile radio 202a detects a session-start event (step 106), which in this case (as determined at step 108) is receipt, via its respective user interface 224, of a session-start command (e.g., the pressing of a PTT button at a time when the mobile radio 202a is not currently participating in a talkgroup session). The mobile radio 202a responsively selects an idle voice channel (here, channel "1") (step 110), and also transmits, via the control channel, a session-start notification that identifies the talkgroup ("TG-202") and specifies the selected voice channel ("1") (step 112). In the depicted example, the mobile radio 202a also adds channel "1" to its busy-channel list, and further selects channel "1" as its second-receiver channel.

FIG. 5 depicts a third example scenario involving the mobile radios of FIG. 3, in accordance with an embodiment. In particular, FIG. 5 depicts an example scenario 500 that is an iteration from the example scenarios 300 and 400 that are described above in connection with FIGS. 3 and 4, respectively. In the example scenario 500, the mobile radios 202b and 202c, each of which (along with the mobile radio 202a) is a member of talkgroup 202, each detect a session-start event (step 106), which in this case (as determined by each respective mobile radio 202b and 202c at step 108) is receipt, via the control channel, of a session-start notification that identifies their talkgroup ("TG-202") and specifies the selected voice channel ("1"). The mobile radio 202b responsively selects its second receiver channel to channel "1" and the mobile radio 202c maintains its second-receiver channel on channel "1" (step 114). Each of the mobile radios 202b and 202c also adds channel "1" to its respective busy-channel list.

The mobile radios 204a-c, each of which is a member of talkgroup 204, each detect a session-start event (step 106), and each determine (at step 108) that the session-start event is receipt via the control channel of a session-start notification that identifies talkgroup 202 and voice channel "1". Each of the mobile radios 204a-c responsively carries out a set of session-avoiding functions. In particular, each of the mobile radios 204*a-c* adds channel "1" to its respective busy-channel list, and each also checks whether its respective second-receiver channel is channel "1". Of the three, this is only true for the mobile radio 204*a*, which accordingly responsively changes is second-receiver channel to an idle voice channel, which happens to be channel "4" in this example.

In at least one embodiment, a mobile radio 200 selects an idle one of the voice channels and carries out a channel-testing process. To carry out the channel-testing process, the mobile radio 202*a* preselects an idle one of the voice channels, transmits (e.g., blank frames, dummy data, and/or the like) on the preselected voice channel for a randomly selected amount of time. Thereafter, the mobile radio 202*a* checks the preselected voice channel for transmissions from any other mobile radio, such as mobile radios 202*b-c* or 204*a-c*. If the mobile radio 202*a* does not detect any other such transmissions on the preselected voice channel, the mobile radio 202*a* designates the preselected voice channel as being the selected voice channel. If transmissions from other mobile radios are detected on the preselected voice channel, then the mobile radio 202*a* updates its voice-channel-status data to indicate that the preselected voice channel is busy, and repeats the channel-testing process.

In at least one embodiment, the mobile radio 202*a* periodically conveys its stored voice-channel-status data via the control channel.

In at least one embodiment, the mobile radio 202*a* maintains its voice-channel-status data at least in part by receiving broadcast voice-channel-status data and responsively accordingly updating its maintained voice-channel-status data.

In at least one embodiment, the mobile radio 202*a* scans one or more of the voice channels; if and when the mobile radio 202*a* detects a session-start event for an ongoing session for the talkgroup 202 on a particular one of the voice channels, then the mobile radio 202*a* plays out audio received on that channel, and updates its voice-channel-status data to indicate that that voice channel is busy. In at least one such embodiment, the mobile radio 202*a* detects an ongoing session for the talkgroup 202 by detecting (on the particular voice channel) an identifier of the talkgroup 202 or by detecting (on the particular voice channel) an identifier of another mobile radio that is also a member of the talkgroup 202. This may occur as a result of each mobile radio being configured to include an identifier of its respective talkgroup and/or an identifier of itself in one or more of its respective outgoing talkgroup transmissions.

In at least one embodiment, the mobile radio 202*a* maintains a hang timer with respect to talkgroup transmissions on the specified voice channel (i.e., on the voice channel on which the mobile radio 202*a* is participating in a talkgroup session as part of the talkgroup 202). Upon detecting an expiration of the hang timer, the mobile radio 202*a* responsively updates its voice-channel-status data to indicate that the specified voice channel is idle. The mobile radio 202*a* also transmits a session-termination message via the control channel. In response receiving to such a session-termination message via the control channel, each of the mobile radios 202*b-c* and 204*a-c* responsively update its respective voice-channel-status data to indicate that the specified voice channel is idle.

Figure 6:
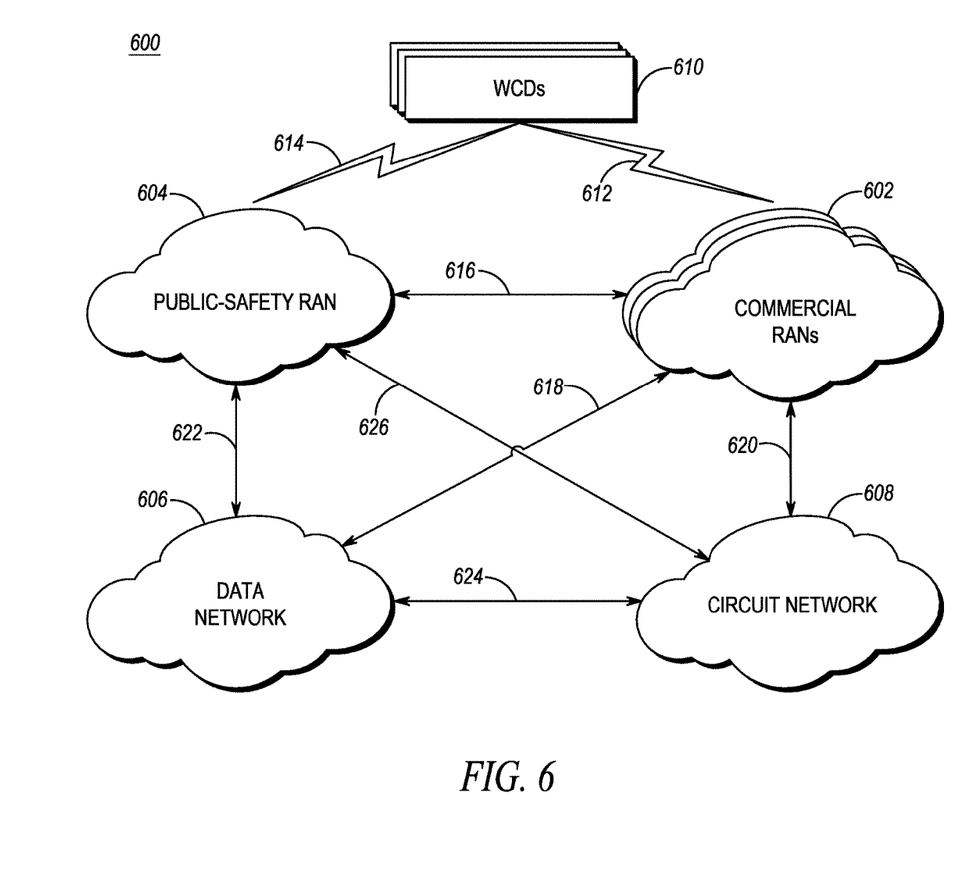
FIG. 6 depicts an example communication system, in accordance with an embodiment.
Figure 7:
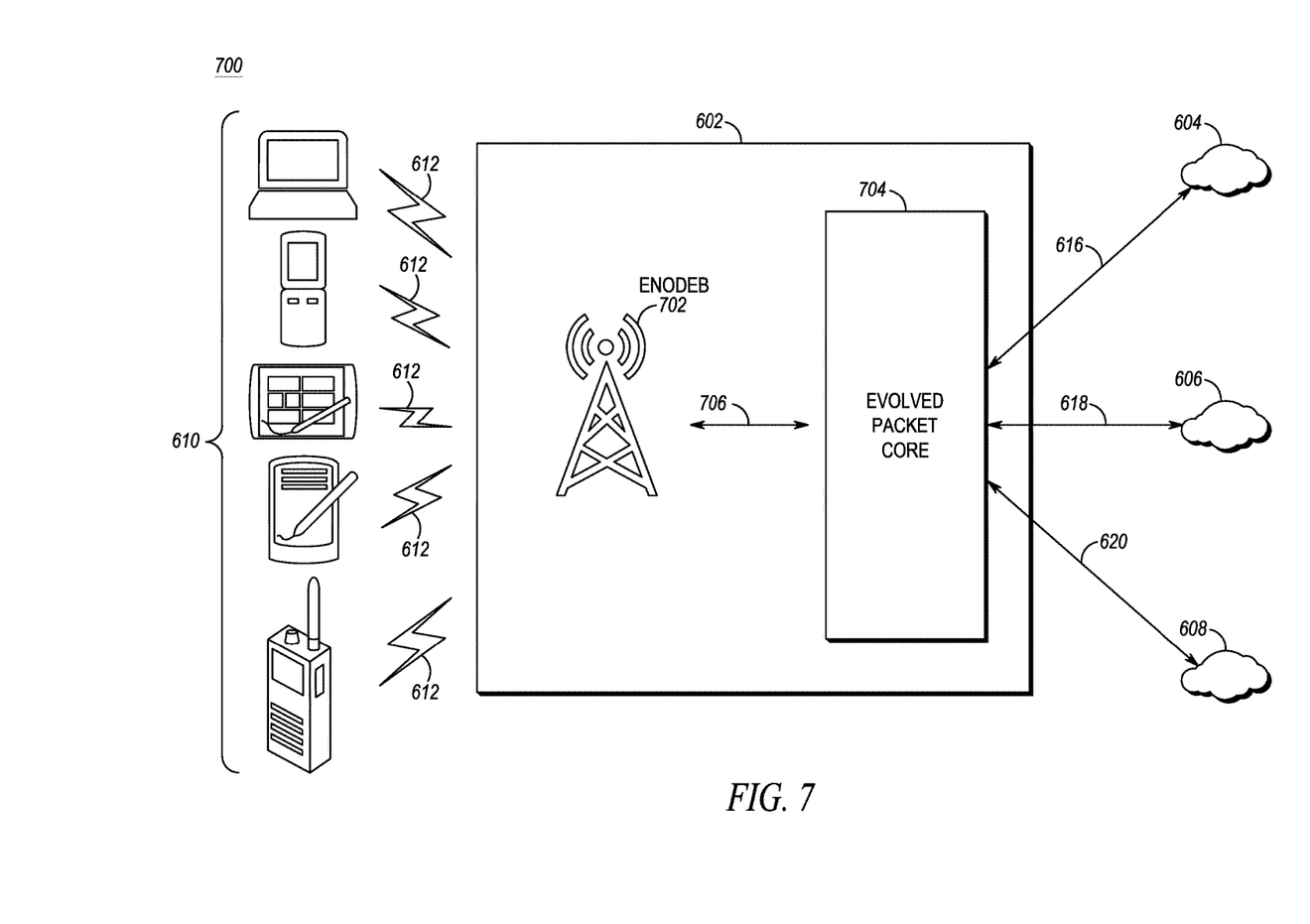
FIG. 7 depicts a further example of the communication system of FIG. 6, in accordance with an embodiment.

The next portion of this disclosure includes descriptions of FIGS. 6-7, which in general depict a communication system in which mobile radios communicate via one or more radio access networks (RANs). It is explicitly noted that mobile radios that communicate via one or more RANs may also be capable of communicating directly with one another in the manner described above. Thus, while mobile radios that are capable of engaging in communication directly with one another but not via one or more RANs could certainly carry out and embody the present methods and systems, mobile radios that are capable of both direct-mode and RAN-based communication could certainly carry out and embody the present methods and systems as well.

FIG. 6 depicts an example communication system, in accordance with an embodiment. In particular, FIG. 6 depicts an example communication system 600 that includes one or more commercial RANs 602, a public-safety RAN 604, a data network 606, a circuit network 608, mobile radios 610, and communication links 612-626. An example commercial RAN 602 is discussed below in connection with FIG. 7, though in general, each RAN 602 and the RAN 604 includes typical RAN elements such as base stations, base station controllers, routers, switches, and the like, arranged, connected, and programmed to provide wireless service to user equipment (e.g., the mobile radios 610) in a manner known to those of skill in the relevant art.

The public-safety RAN 604 may include one or more packet-switched networks and/or one or more circuit-switched networks, and in general functions to provide one or more public-safety agencies with any necessary computing and communication needs. Thus, the public-safety RAN 604 may include a dispatch center communicatively connected with the data network 606 and also with the circuit network 608, for retrieving and transmitting any necessary public-safety-related data and communications. The public-safety RAN 604 may also include any necessary computing, data-storage, and data-presentation resources utilized by public-safety personnel in carrying out their public-safety functions. Moreover, the public-safety RAN 604 may include one or more network access servers (NASs), gateways, and the like for bridging communications to one or more other entities and/or networks, such as the commercial RANs 602, the data network 606, and the circuit network 608, as representative examples.

The data network 606 may be, include, or be a part of the global network of networks typically referred to as the Internet. The data network 606 may be a packet-switched network, and entities (i.e., servers, routers, computers, and the like) that communicate over the data network 606 may be identified by a network address such as an Internet Protocol (IP) address. Moreover, the data network 606 may include one or more NASs, gateways, and the like for bridging communications to one or more other entities and/or networks, such as the commercial RANs 602, the public-safety RAN 604, and the circuit network 608, as representative examples.

The circuit network 608 may be, include, or be a part of the circuit-switched telephone network commonly referred to as the public switched telephone network (PSTN), and in general functions to provide circuit-switched communications to various communication entities as is known in the art. Moreover, the circuit network 608 may include one or more NASs, gateways, and the like for bridging communications to one or more other entities and/or networks, such as the commercial RANs 602, the public-safety RAN 604, and the data network 606, as representative examples.

The depicted example communication system 600 includes communication links 612-626, any one or more of which could include one or more wireless-communication links and/or one or more wired-communication links. In FIG. 6, the communication links 612 and 614 are depicted with respective lightning-bolt graphics; while this graphic typically denotes wireless communication, and does in this example as well, this is not to the exclusion of one or more of the other communication links 614-626 being or at least including wireless-communication links as well.

As can be seen in FIG. 6, the communication link 612 (as mentioned above) connects the commercial RANs 602 and the mobile radios 610, the communication link 614 (as mentioned above) connects the public-safety RAN 604 and the mobile radios 610, the communication link 616 connects the commercial RANs 602 and the public-safety RAN 604, the communication link 618 connects the commercial RANs 602 and the data network 606, the communication link 620 connects the commercial RANs 602 and the circuit network 608, the communication link 622 connects the public-safety RAN 604 and the data network 606, the communication link 624 connects the data network 606 and the circuit network 608, and the communication link 626 connects the public-safety RAN 604 and the circuit network 608. This arrangement is provided purely by way of example, as other arrangements could be implemented by those of skill in the relevant art in various different contexts.

The mobile radios 610 may be any suitable computing and communication devices configured to engage in wireless communication with one or both of (i) the commercial RANs 602 over the air interface 612 as is known to those in the relevant art and (ii) the public-safety RAN 604 over the air interface 614 as is known to those in the relevant art. Some example mobile radios 610 and communication links 612 are discussed below in connection with the various figures.

FIG. 7 depicts a further example of the communication system of FIG. 6, in accordance with an embodiment. FIG. 7 depicts the communication system 600 of FIG. 6, though in more detail regarding some example mobile radios 610 and an example commercial RAN 602, although a similar figure could be depicted with the sole change being the use of an example public-safety RAN 604 instead of the example commercial RAN 602. In particular, FIG. 7 depicts the RAN 602 as including an eNodeB 702, which communicates directly or indirectly with an evolved packet core (EPC) 704 over a communication link 706. As is the case with each of the links mentioned above, and as is the case with any of the links mentioned anywhere else in this disclosure, the communication link 706 may be or include one or more wireless-communication links and/or one or more wired-communication links, as deemed suitable by those of skill in the relevant art in a given context.

In at least one embodiment, the eNodeB 702 includes the hardware and software (and/or firmware) necessary for the eNodeB 702 to function as an eNodeB, a NodeB, a base station, a base transceiver station (BTS), a WiFi access point, and/or the like, as known to those having skill in the relevant art. In some instances, the eNodeB 702 in the example RAN 602 may also include functionality typically associated in the art with entities that are often referred to by terms such as base station controllers (BSCs), radio network controllers (RNCs), and the like. Also, while one eNodeB 702 is depicted by way of example in FIG. 7, any suitable number of eNodeBs could be deployed as deemed suitable by those of skill in the relevant art.

In general, the eNodeB 702 is an entity that, on one side (i.e., the wireless-network side (interface)), engages in wireless communication over the air interface 612 with one or more mobile radios 610 according to a protocol such as LTE or the like and, on the other side (i.e., the "backhaul" side), engages in communications with the EPC 164 via the communication link 706, to facilitate communications between various mobile radios 610 and networks such as the networks 604, 606, and 608.

The EPC 704 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the mobile radios 610 via the eNodeB 702, and to bridge such wireless service with various transport networks. In general, a commercial RAN and a public-safely RAN may each provide wireless service according to a protocol such as LTE, WiFi, and/or the like. These examples are provided for illustration and not by way of limitation; moreover, those of skill in the relevant art are aware of variations among different protocols and among different implementations of a given protocol, and of similarities across different protocols.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a mobile radio that is a member of a talkgroup, the mobile radio having first and second receivers and a preconfigured channel list that includes a control channel and multiple voice channels, the method comprising:
    maintaining voice-channel-status data reflecting which of the voice channels in the preconfigured channel list are currently busy or idle;
    monitoring the control channel at least in part by residing the first receiver on the control channel;
    detecting a session-start event;
    if the session-start event comprises receipt, via a user interface, of a session-start command, then carrying out a set of one or more session-initiation functions, the set of session-initiation functions comprising:
        selecting an idle one of the voice channels; and
        transmitting, via the control channel, a session-start notification that identifies the talkgroup and specifies the selected voice channel; and
    if the session-start event comprises receipt, via the control channel, of a session-start notification that identifies the talkgroup and specifies one of the voice channels in the preconfigured channel list, then carrying out a set of one or more session-joining functions, the set of session-joining functions comprising:
        determining whether the second receiver is currently tuned to the specified voice channel and, if not, then responsively tuning the second receiver to the specified voice channel.

2. The method of claim 1, further comprising residing the second receiver on an idle one of the voice channels when not participating in a talkgroup session.

3. The method of claim 1, further comprising powering down the second receiver when not participating in a talkgroup session.

4. The method of claim 1, the set of session-initiation functions further comprising updating the voice-channel-status data to indicate that the specified voice channel is busy.

5. The method of claim 1, the set of session-joining functions further comprising updating the voice-channel-status data to indicate that the specified voice channel is busy.

6. The method of claim 1, further comprising:
    if the session-start event comprises receipt, via the control channel, of a session-start notification that identifies a different talkgroup and specifies one of the voice channels in the preconfigured channel list, then carrying out a set of one or more session-avoiding functions, the set of session-avoiding functions comprising:
        updating the voice-channel-status data to indicate that the specified voice channel is busy; and
        determining whether the second receiver is currently tuned to the specified voice channel and, if so, then responsively configuring the second receiver to not be tuned to the specified voice channel.

7. The method of claim 6, wherein configuring the second receiver to not be tuned to the specified voice channel comprises tuning the second receiver to an idle one of the voice channels.

8. The method of claim 6, wherein configuring the second receiver to not be tuned to the specified voice channel comprises powering down the second receiver.

9. The method of claim 1, further comprising detecting, via the second receiver, that a voice channel to which the second receiver is currently tuned is in use by a different talkgroup, and responsively:
    muting that voice channel; and
    updating the voice-channel-status data to indicate that that voice channel is busy.

10. The method of claim 1, wherein selecting an idle one of the voice channels comprises carrying out a channel-testing process comprising:
    preselecting an idle one of the voice channels;
    transmitting on the preselected voice channel for a randomly selected amount of time, and thereafter checking the preselected voice channel for transmissions from another mobile radio;
    if no other such transmissions are detected on the preselected voice channel, then:

designating the preselected voice channel as being the selected voice channel; and if such transmissions are detected on the preselected voice channel, then:

updating the voice-channel-status data to indicate that the preselected voice channel is busy; and repeating the channel-testing process.

11. The method of claim 1, further comprising periodically conveying the voice-channel-status data via the control channel.

12. The method of claim 1, wherein maintaining the voice-channel-status data comprises receiving broadcast voice-channel-status data and responsively accordingly updating the maintained voice-channel-status data.

13. The method of claim 1, further comprising:

scanning one or more of the voice channels; and if the session-start event comprises detecting, while scanning one or more of the voice channels, an ongoing session for the talkgroup on a particular one of the voice channels, then:

playing out audio received on the particular voice channel; and updating the voice-channel-status data to indicate that the particular voice channel is busy.

14. The method of claim 13, wherein detecting an ongoing session for the talkgroup comprises detecting an identifier of the talkgroup.

15. The method of claim 13, wherein detecting an ongoing session for the talkgroup comprises detecting an identifier of another mobile radio that is also a member in the talkgroup.

16. The method of claim 13, further comprising updating the voice-channel-status data based at least in part on the scanning of one or more of the voice channels.

17. The method of claim 1, further comprising:

maintaining a hang timer with respect to talkgroup transmissions on the specified voice channel; and detecting an expiration of the hang timer, and responsively carrying out a set of session-termination functions, the set of session-termination functions comprising:

updating the voice-channel-status data to indicate that the specified voice channel is idle.

18. The method of claim 17, the set of session-termination functions further comprising transmitting a session-termination message via the control channel.

19. The method of claim 1, further comprising receiving a session-termination message via the control channel, and responsively updating the voice-channel-status data to indicate that the specified voice channel is idle.

20. A mobile radio that is a member of a talkgroup, the mobile radio comprising:

first and second receivers;

a transmitter;

a preconfigured channel list that includes a control channel and multiple voice channels;

a processor, and data storage containing instructions executable by the processor for causing the mobile radio to carry out a set of functions, the set of functions including:

maintaining voice-channel-status data reflecting which of the voice channels in the preconfigured channel list are currently busy or idle;

monitoring the control channel at least in part by residing the first receiver on the control channel;

detecting a session-start event;

if the session-start event comprises receipt of a session-start command via a user interface, then carrying out a set of one or more session-initiation functions, the set of session-initiation functions comprising:

selecting an idle one of the voice channels; and transmitting, via the transmitter and control channel, a session-start notification that identifies the talkgroup and specifies the selected voice channel; and if the session-start event comprises receipt, via the control channel, of a session-start notification that identifies the talkgroup and specifies one of the voice channels in the preconfigured channel list, then carrying out a set of one or more session-joining functions, the set of session-joining functions comprising:

determining whether the second receiver is currently tuned to the specified voice channel and, if not, then responsively tuning the second receiver to the specified voice channel.

\* \* \* \* \*